United States Patent [19]

Heinrich et al.

[11] 4,313,872
[45] Feb. 2, 1982

[54] AZO COUPLING IN TWO-PHASE WATER-ALCOHOL MIXTURES

[75] Inventors: Ernst Heinrich, Neu-Isenburg; Joachim Ribka, Offenbach am Main-Bürgel, both of Fed. Rep. of Germany

[73] Assignee: Cassella Aktiengesellschaft, Frankfurt am Main Fechneheim, Fed. Rep. of Germany

[21] Appl. No.: 904,107

[22] Filed: May 8, 1978

Related U.S. Application Data

[63] Continuation-in-part of Ser. No. 762,931, Jan. 26, 1977, abandoned.

[30] Foreign Application Priority Data

Feb. 2, 1976 [DE] Fed. Rep. of Germany ....... 2603836
May 20, 1977 [DE] Fed. Rep. of Germany ....... 2722768

[51] Int. Cl.$^3$ ............... C09B 29/01; C09B 29/06; C09B 29/24; C09B 29/36

[52] U.S. Cl. ................................. 260/152; 260/144; 260/157; 260/158; 260/164; 260/186; 260/187; 260/205; 260/206; 260/207; 260/207.1; 260/207.5

[58] Field of Search ............ 260/205, 206, 207, 207.1, 260/207.5, 164, 186, 187, 152, 158, 144 P, 157

[56] References Cited

U.S. PATENT DOCUMENTS

| | | | |
|---|---|---|---|
| 2,496,151 | 1/1950 | Dawson et al. | 260/206 |
| 2,824,096 | 2/1958 | Heckert | 260/192 |
| 3,040,019 | 6/1962 | Neier | 260/196 X |
| 3,218,309 | 11/1965 | Elslager et al. | 260/152 |
| 3,335,168 | 8/1967 | Dehn et al. | 260/204 X |
| 3,352,845 | 11/1967 | Armento | 260/152 |

*Primary Examiner*—Floyd D. Higel
*Attorney, Agent, or Firm*—Connolly and Hutz

[57] ABSTRACT

Azo dyes are very simply made in high purity and very good yield by coupling a diazonium compound with a coupling compound in a mixture essentially of water with a simple alkanol having four to six carbons and soluble in water to the extent of not over about 15% by weight at 15° C. This procedure is particularly effective with compounds that are ordinarily difficult to couple.

12 Claims, No Drawings

AZO COUPLING IN TWO-PHASE WATER-ALCOHOL MIXTURES

This is a continuation-in-part of application Ser. No. 762,931 filed Jan. 26, 1977, now abandoned.

The present invention relates to the manufacture of azo dyes.

Among the objects of the present invention is the provision of an improved method for making azo dyes of very high purity and in very good yield.

The foregoing as well as additional objects of the present invention will be more fully understood from the following description of several of its exemplifications.

According to the present invention an azo dye is prepared by coupling a diazonium compound with a coupling compound in a mixture of water with a simple alkanol having four to six carbons in the molecule and soluble in water to the extent of not over about 15% by weight at 15° C., the mixture containing from about 15 to about 90% alkanol by weight, and then directly separating the dye in over 85% purity from the reaction mixture.

The mixture generally contains a little acid inasmuch as the coupling proceeds best under acid conditions, such as at a pH of from about 2 to about 5. Acid can also be formed by the coupling and a buffer such as sodium acetate can also be present if it is desired to keep the acid from building up in strength.

The dye formation in the coupling reaction of the present invention is particularly rapid, even with reactants that are normally difficult or very slow to couple. The dye formed is most readily separated from the coupling reaction mixture by filtration and it is then recovered in a purity of at least about 92%. It is sometimes desirable to volatilize off some or all of the alkanol, as by steam distillation, before filtering off the dye, and the dye separated in this way generally has a slightly lower purity as compared to when there is no previous volatilization, but the purity is still over 85%. Yields depend on the solubility of the dye and are generally at least about 80% without volatilization and at least about 90% with volatilization, particularly where at least about half the alkanol is volatilized away.

In carrying out the process of the present invention it is preferable to effect the coupling in a mixture of about 50 to about 25% by weight of the alkanol and about 50 to about 75% by weight of water.

Examples of suitable alkanols employed according to the present invention include n-butanol, iso-butanol, n-amyl alcohol, diethyl carbinol, isobutyl carbinol, n-hexanol and iso-hexanol. n-Butanol and iso-butanol are preferred.

The advantages of the process according to the present invention are due to the very special physico-chemical properties of the two-phase system formed from the foregoing mixtures. In this connection a particular significance attaches to the small solubility in water of the alkanols to be employed, and solubility of the water in the alkanols. The solubilities in water of the preferred alkanols, n-butanol and iso-butanol, are 6.8 and 7.4% by weight, respectively, at 15° C.

Conversely, the solubility of water in n-butanol is 27.3% by weight and in isobutanol is 16.0% by weight at this temperature.

The process of the present invention can be carried out with the diazonium compound produced in situ, that is to say in the reaction mixture itself, from a diazotizable aromatic amine and a diazotization agent. Thus a diazotization agent can be introduced into a mixture of a diazotizable aromatic amine, a coupling component, an acid and a mixture of water with the alkanol. If necessary, the temperature of the reaction mixture during diazotization can be kept between 0° and +60° C., preferably 0° and +5° C., as by external cooling. After the diazotization is complete the coupling compound can be added to complete the dye formation.

This combined process is most desirably carried out with amines which can be diazotized easily, that is to say amines which contain not more than one group of a negative character, such as a nitro group, in the molecule, and with coupling components which couple easily or are readily soluble in organic solvents.

The diazotization agents used can be the salts of nitrous acid, particularly the alkali metal salts, such as, for example, sodium nitrate, and also substances which evolve nitrous acid, such as nitrosylsulphuric acid and esters of nitrous acid with primary, monohydric, aliphatic alcohols having 1 to 6 carbon atoms, for example the methyl, ethyl, n-propyl, isopropyl, n-butyl, isobutyl, tert.-butyl, n-pentyl, isopentyl or n-hexyl esters.

The process of the present invention can be carried out by introducing a stabilized diazonium compound which has been isolated and, if appropriate, dried, into a mixture of a coupling component and the solvent or dispersing medium.

It can also be carried out by introducing a water solution of a diazonium compound containing inorganic or organic acid, into a mixture of a coupling compound and the alkanol. In this process the solution of the diazonium compound which is to be introduced is manufactured in a reaction stage prior to the coupling, by diazotizing a diazotizable aromatic amine in an aqueous or concentrated inorganic or organic acid. Some of the alkanol can be present in the diazotizing mixture, and some water may be present in the coupling compound dispersion.

It is appropriate to select this process when using diazotizable amines which contain more than one group of negative character in the molecule or with coupling components which couple with difficulty.

Suitable acids for use in the coupling reaction of the present invention are those inadequately strong inorganic and organic acids which are known to be suitable for coupling in an acid medium. Hydrochloric acid, hydrobromic acid, sulphuric acid, or the various phosphoric acids are mentioned as examples of suitable inorganic acids. Formic acids, acetic acid, chloroacetic acid and propionic acid are examples of acids from the series of organic acids which can be used.

In order to accelerate the coupling and to take up the quantities of acid which are additionally liberated during the coupling, it can be advisable to buffer the reaction mixture as pointed out above. Buffer substances which are in themselves known are added to the reaction mixture for this purpose; known buffer substances are, inter alia, the alkali metal salts of fairly weak acids, such as the sodium acetate mentioned.

Particularly when carrying out the process of the present invention by adding a diazo component which has been previously isolated and, if appropriate, stabilized, it is very advisable to have buffer present.

Regardless of how the coupling reaction of the present invention is conducted, the usual coupling temperatures of 0° to 80° C. are adhered to, although it is preferred to stay below 60° C., and a maximum limit of 5° C. is especially effective.

It is helpful to vigorously stir the coupling reaction mixtures of the present invention so that the alkanol phase and the water phase are well intermingled. The complete absence of stirring is not desired.

The process of the present invention works particularly well with diazotized amines of the general formulas I and II $$\underset{X^3}{\underset{|}{X^2}}\!\!-\!\!\underset{}{\bigcirc}\!\!-\!\!NH_2 \qquad X^1 \qquad I$$

wherein $X^1$ and $X^2$ independently denote hydrogen or halogen atoms, alkyl or alkoxy groups containing 1 to 4 C atoms, nitro, cyano or trifluoromethyl groups, alkoxycarbonyl containing 1 to 8 C atoms in the alkoxy moiety, alkylcarbonyl containing 1 to 8 C atoms in the alkyl moiety, carboxamide, N-monoalkylcaboxamide containing 1 to 8 C atoms in the alkyl moiety, N,N-dialkyl-carboxyamide containing 1 to 8 C atoms in each alkyl moiety, alkylsulphonyl containing 1 to 8 C atoms in the alkyl moiety, sulphonamide, N-monoalkyl-sulphonamide containing 1 to 8 C atoms, N,N-dialkyl-sulphonamide containing 1 to 8 C atoms in each alkyl moiety, or phenoxy, phenalkoxy containing 1 to 2 C atoms in the alkoxy moiety, phenylsulphonyl or benzoyl groups, the phenoxy, phenalkoxy, phenylsulphonyl or benzoyl groups being optionally substituted by halogen atoms or by alkyl or alkoxy groups containing 1–4 C atoms, and $X^3$ denotes a hydrogen or halogen atom, and $$X^5\!-\!\!\underset{\underset{X^3}{|}}{\bigcirc}\!\!-\!\!N\!\!=\!\!N\!\!-\!\!\underset{\underset{X^7}{|}}{\bigcirc}\!\!-\!\!NH_2 \qquad \begin{array}{c}X^4 \qquad X^6\\ \\ \end{array} \qquad II$$

wherein $X^3$ is as defined above;

$X^4$ and $X^5$ independently denote hydrogen or halogen atoms, alkyl or alkoxy groups containing 1 to 4 C atoms, nitro, cyano or trifluoromethyl groups or alkoxycarbonyl, alkylcarbonyl or alkylsulphonyl groups containing 1–8 C atoms in the alkoxy or alkyl moieties.

$X^6$ and $X^7$ are identical or different and denote a hydrogen or halogen atom or an alkyl or alkoxy group containing 1 to 4 C atoms; and $X^7$ can also denote an alkylcarbonyl-amino group containing 1–8 C atoms.

The following amines may be mentioned as examples: aniline,2-,3- or 4-chloroaniline,2,4- or 2,5-dichloroaniline, 2,4,6-trichloroaniline, 2,4,6-tribromoaniline, 2-, 3- or 4-methylaniline, 4-n.-butylaniline, 2-methyl-3-, -4-, -5- or -6-chloroaniline, 2-, 3- or 4-methoxyaniline, 2- or 4-phenoxyaniline, 2,5-dimethoxyaniline, 2,5-diethoxyaniline, 2,5-dimethoxy-4-chloroaniline, 2-methoxy-5-chloroaniline, 2-ethoxy-5-chloroaniline, 2-phenoxy-5-chloroaniline, 2-, 3- or 4-nitroaniline, 2-methyl-4-nitroaniline, 2-nitro-4-methylaniline, 2,4-dinitroaniline, 2,4-dinitro-6-chloroaniline, 2,4-dinitro-6-bromoaniline, 2,5-dichloro-4-nitro-aniline, 2,6-dichloro-4-nitroaniline, 2,6-dibromo-4-nitro-aniline, 2-chloro or 2-bromo-4-nitroaniline, 2-methoxy-4-nitroaniline, 4-methoxy-2-nitroaniline, 2-ethoxy-4-nitro-aniline, 4-ethoxy-2-nitroaniline, 2-, 3- or 4-cyanoaniline, 2,4-dicyanoaniline, 2-methyl-4-cyanoaniline, 2-cyano-4-nitroaniline, 2,6-dichloro-4-cyanoaniline, 5-chloro-4-cyano- 2-nitroaniline, 2,4-dinitro-6-cyano-aniline, 3-trifluoromethylaniline, 3,5-bis-(trifluoromethyl)-aniline, 2-trifluoromethyl-4-chloro-aniline, 2-trifluoromethyl-5-chloroaniline, 2-, 3- or 4-amino-benzoic acid ethyl ester, 2-, 3- or 4-amino-benzoic acid n.-butyl ester, 2-, 3- or 4-amino-benzoic acid 2'-ethyl-n.-hexyl ester, 2-amino-3- or -4-chloro-benzoic acid methyl ester, 2-amino-3,5-dichlorobenzoic acid methyl ester, 4-amino-3-bromo-benzoic acid methyl ester, 3-amino-4-chloro-benzoic acid methyl ester, 2-, 3- or 4-amino-benzoic acid amide, 2-, 3- or 4-amino-benzoic acid monomethylamide, 2-, 3- or 4-amino-benzoic acid dimethylamide, 2-, 3- or 4-amino-benzoic acid isopropylamide, 2-, 3- or 4-amino-benzoic acid diethylamide, 2-, 3- or 4-amino-benzoic acid di-n.-butylamide, 2-, 3- or 4-amino-benzoic acid 2'-ethyl-n.-hexylamide, 2-, 3- or 4-amino-benzenesulphonic acid amide, 2-, 3- or 4-amino-benzenesulphonic acid monomethylamide, 2-, 3- or 4-amino-benzenesulphonic acid dimethylamide, 2-, 3- or 4-amino-benzenesulphonic acid diethylamide, 2-, 3- or 4-amino-benzenesulphonic acid di-n.-butylamide, 2-, 3- or 4-amino-benzenesulphonic acid 2'-ethyl-n.-hexylamide, 1-methyl-2-amino-benzene-4-sulphonic acid amide, 1-methyl-2-amino-benzene-4-sulphonic acid n.-hexylamide, 1-methoxy-2-amino-benzene-4-sulphonic acid amide, 1-methoxy-2-amino-benzene-4-sulphonic acid dimethylamide, 1-methoxy-2-amino-benzene-4-sulphonic acid di-n.-butylamide, 1-chloro-2-amino-benzene-4-sulphonic acid dimethylamide, 1-chloro-3-amino-benzene-4-sulphonic acid amide, 1-chloro-4-amino-benzene-2-sulphonic acid dimethylamide, 1-nitro-4-amino-benzene-3-sulphonic acid di-n.-butylamide, 2-, 3- or 4-aminoacetophenone, 2-, 3- or 4-aminobenzophenone, 4-amino-4'-chlorobenzophenone, 4-amino-2',4'-dichlorobenzophenone, 2-amino-4'-bromobenzophenone, 2-amino-2',4'-dimethylbenzophenone, 4-amino-2'-methylbenzophenone, 4-amino-4'-ethylbenzophenone, 2-amino-4'-methoxy-benzophenone, 3-amino-3',4'-dimethoxybenzophenone, 4-amino-4'-methoxybenzophenone, 3-amino-4'-methoxybenzophenone, 4-amino-4'-n.-butylbenzophenone, 4-amino-4'-isopropylbenzophenone, 2-amino-4'-fluorobenzophenone, 2-amino-5-bromobenzophenone, 4-amino-3-chlorobenzophenone, 2-amino-4,5-dichlorobenzophenone, 4-amino-3,5-dibromobenzophenone, 4-amino-2-methylbenzophenone, 2-amino-5-methylbenzophenone, 2-amino-4,5-dimethylbenzophenone, 3-amino-2,4-dimethylbenzophenone, 2-amino-4,5-dimethoxybenzophenone, 2-amino-4-methoxybenzophenone, 2-methylsulphonyl-aniline, 3-methylsulphonyl-aniline, 4-methylsulphonyl-aniline, 4-chloro-2-methylsulphonyl-aniline, 2-chloro-4-methylsulphonyl-aniline, 2-phenylsulphonyl-aniline, 3-phenylsulphonyl-aniline, 4-phenyisulphonyl-aniline, 2-chloro-4-phenylsulphonyl-aniline, 4-chloro-2-(4'-chlorophenylsulphonyl)-aniline, 4-(4'-bromophenylsulphonyl)-aniline, 3-chloro-4-(phenylsulphonyl)-aniline, 5-chloro-2-(phenylsulphonyl)-aniline, 4-chloro-3-(phenylsulphonyl)-aniline, 4-chloro-2-(phenylsulphonyl)-aniline, 2-bromo-4-(phenylsulphonyl)-aniline, 4-(2',4'-dichlorophenylsulphonyl)-aniline, 4-(4'-methylsulphonyl)-aniline, 4-(4'-isopropylphenylsulphonyl)-aniline, 4-(4'-fluorophenylsulphonyl)-aniline, 4-(3'-chloro-4'-methoxyphenylsulphonyl)-aniline, 4-(2',4'-dimethoxyphenylsulphonyl)-aniline, 4-(3',5'-dimethoxyphenylsulphonyl)-aniline, 4-(4'-methoxyphenylsulphonyl)-aniline, 4-(4'-ethoxyphenylsulphonyl)-aniline, 2-(4'-methoxyphenylsulphonyl)-aniline, 4-(4'-n.-butylphenylsulphonyl)-aniline, 4-(4'-n.-butoxyphenylsulphonyl)-aniline, 4-(2',4'-dimethylsulphonyl)-aniline, 4-amino-diphenyl ether, 4-amino-3-nitro-diphenyl ether, 4-amino-3-nitro-4'-chloro-diphenyl ether, 4-amino-3-nitro-4'-methyl-diphenyl ether, 4-amino-3-nitro-4'-n.-butoxy-diphenyl ether, 4-amino-diphenylmethane, 4-amino-3-nitro-diphenylmethane, 4-amino-azobenzene, 4-amino-4'-nitroazobenzene, 4-amino-2,2'-dimethyl-azobenzene, 4-amino-4'-isobutyl-azobenzene, 4-amino-4'-n.-butoxy-azobenzene, 4-amino-3-methoxy-6-methyl-2'-cyano-4'-nitro-azobenzene, 4-amino-3-methoxy-6-methyl-2',4'-dinitro-azobenzene, 4-amino-3,6-dimethyl-2'-cyano-4'-nitro-azobenzene, 4-amino-3,6-dimethyl-2',4'-dinitro-azobenzene, 4-amino-3,6-dimethoxy-4'-nitro-azobenzene, 4-amino-3,6-dimethoxy-2'-chloro-4'-nitro-azobenzene, 4-amino-3,6-dimethoxy-2',6'-dichloro-4'-nitro-azobenzene, 4-amino-3-ethoxy-4'-nitro-azobenzene, 4-amino-3-sec.-butoxy-2'-chloro-4'-nitro-azobenzene, 4-amino-6-isopropyl-4'-nitro-azobenzene, 4-amino-4'-trifluoromethyl-azobenzene, 4-amino-4'-ethoxycarbonyl-azobenzene, 4-amino-3,6-dimethoxy-4'-(2''-ethyl-n.-hexoxycarbonyl)-azobenzene, 4-amino-3,6-dimethyl-4'-methylcarbonyl-azobenzene, 4-amino-3,6-dimethyl-4'-methylsulphonylazobenzene, 4-amino-3-methoxy-6-methyl-4'-(2''-ethyl-n.-hexylsulphonyl)-azobenzene, 4-amino-2-chloro-4'-nitro-azobenzene, 4-amino-2-methyl-2'-chloro-4'-nitro-azobenzene, 4-amino-6-acetylamino-2'-cyano-4'-nitro-azobenzene, 4-amino-6-(2'''-ethyl-n.-hexanamido)-2'-cyano-4'-nitro-azobenzene, 4-amino-3-methoxy-6-acetylamino-2'-cyano-4'-nitro-azobenzene, 4-amino-3-ethoxy-6-n.-butyrylamino-2',4'-dinitro-azobenzene, 4-amino-3-n.-butoxy-6-acetylamino-2'-chloro-4'-nitro-azobenzene, 2-amino-4-methoxy-5-methyl-2'-chloro-4'-nitro-azobenzene, 2-amino-4-methoxy-5-methyl-2'-methylsulphonyl-4'-nitro-azobenzene, 4-amino-3-chloro-3'-nitro-azobenzene, 4-amino-3-chloro-4'-nitro-azobenzene, 4-amino-3-methyl-6-methoxy-2'-nitro-4'-methyl-azobenzene and 4-amino-3,6-dimethoxy-3'-nitro-azobenzene.

Coupling components which are preferred for use in this process are aromatic amines of the general formulas III and IV

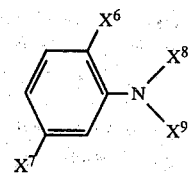

III wherein
X⁶ and X⁷ have the meaning indicated above, and
X⁸ and X⁹ independently denote alkyl radicals which contain 1 to 4 C atoms and which can optionally be mono-substituted by halogen atoms, hydroxyl or cyano groups, alkylcarbonyloxy containing 1 to 4 C atoms in the alkyl moiety, alkoxy groups containing 1 to 4 C atoms, alkoxycarbonyl or alkoxycarbonyloxy having 1 to 4 C atoms in the alkoxy moieties, or phenoxycarbonyl, phenoxycarbonyloxy, cyclohexyl, phenyl or phenoxy groups which are optionally substituted by halogen atoms or by alkyl or alkoxy groups containing 1 to 4 C atoms, and X⁸ and X⁹ can with the N form a heterocyclic ring in which the N is linked through methylene groups to oxygen, another N or an additional carbon;

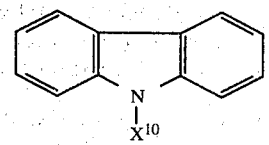

IV wherein X¹⁰ has the meaning of hydrogen or of X⁸.

The following coupling components may be listed as examples: N,N-dimethylaniline, N,N-diethylaniline, N,N-dimethyl-3-methyl-aniline, N,N-diethyl-2-methyl-aniline, N,N-di-(n.-propyl)-2-methoxy-aniline, N-methyl-N-(β-cyanoethyl)-aniline, N-ethyl-N-(β-cyanoethyl)-aniline, N,N-bis-(β-cyanoethyl)-aniline, N,N-dimethyl-2-chloro-aniline, N,N-diethyl-3-chloro-aniline, N-methyl-N-(γ-cyano-n.-propyl)-3-methoxy-aniline, N-cyanoethyl-N-(β-acetoxyethyl)-aniline, N,N-bis-(β-acetoxyethyl)-aniline, N,N-bis-(γ-n.-butyryloxy-n.-propyl)-2-methyl-aniline, N-ethyl-N-(β-cyanoethyl)-3-methyl-aniline, N-(β-cyanoethyl)-N-(β-hydroxyethyl)-aniline, N,N-bis-(β-hydroxyethyl)-aniline, N,N-bis-(β-hydroxyethyl)-3-methyl-aniline, N,N-dimethyl-3-chloro-aniline, N-ethyl-N-benzyl-2-methoxy-5-acetylamino-aniline, N-β-phenethyl-N-β-cyanoethyl-aniline, N-methyl-N-β-phenethyl-3-methyl-aniline, N,N-dibenzyl-2-methoxy-5-acetylamino-aniline, N,N-diethyl-3-acetylamino-aniline, N,N-diethyl-3-(β-ethyl-n.-hexanamido)-aniline, N-benzyl-N-β-cyanoethyl-3-acetylamino-aniline, N,N-bis-β-acetoxyethyl-3-acetylamino-aniline, N,N-bis-β-n.-butyryloxyethyl-3-propionylamino-aniline, 2-methoxy-5-acetylamino-N,N-diethylaniline, N,N-dimethyl-2-methoxy-5-methylaniline, N,N-bis-(β-hydroxyethyl)-2-methoxy-5-chloro-aniline, N,N-dimethyl-2,5-dimethoxy-aniline, N-methyl-N-(β-γ-dihydroxy-n.-propyl)-2-chloro-5-methyl-aniline, N-phenyl-morpholine, N-(2'-methoxyphenyl)-morpholine, N-(2'-methyl-phenyl)-morpholine, N,N-diethyl-2-methoxy-5-methyl-aniline, N,N-diethyl-3-methoxy-aniline, N,N-dimethyl-3-methyl-aniline, N-ethyl-N-(β-ethoxy-carbonyl-ethyl)-aniline, N-(β-cyanoethyl)-N-(65 -n.-butoxy-carbonyl-n.-propyl)-aniline, 3-acetylamino-N-methyl-N-(β-ethoxy-carbonyl-ethyl)-aniline, N-ethyl-N-(β-ethoxy-carbonyloxy-ethyl)-aniline, N-β-chloroethyl-N-(β-ethoxy-carbonyloxy-ethyl)-aniline, N-ethyl-N-(β-phenoxycarbonyl-ethyl)-aniline, N-ethyl-N-(γ-phenoxycarbonyl-n.-propyl)-aniline N-(β-hydroxyethyl)-N-(β-4-methyl-phenoxycarbonyl-ethyl)-aniline, N-methyl-N-(β-phenoxy-carbonyloxyethyl)-aniline, N-methyl-N-β-cyclohexyl-ethyl-aniline, N-β-cyanoethyl-N-(4-methoxy-benzyl)-aniline, N-β-cyanoethyl-N-(4-chloro-62 -phenethyl)-aniline, N-ethyl-N-(4-n.-butyl-β-phenethyl)-aniline, N-β-cyanoethyl-N-(β-4-methyl-phenoxyethyl)-aniline, carbazole, N-methyl-carbazole, N-ethylcabazole, N-sec.-butyl-carbazole, N-n.-butyl-cabazole, N-β-hydroxy-ethyl-cabazole, N-β-cyanoethyl-carbazole, N-β-acetoxy-ethyl-carbazole, N-γ-n.-butyryloxy-n.-propylcarbazole, N-β-phenethyl-carbazole, N-(β-4'-methyl-phenethyl)-carbazole, N-(β-4'-methoxy-phenethyl)-carbazole, N-(4'-phenoxy-carbonyl-phenyl)-carbazole, N-(β-ethoxy-carbonylethyl)-carbazole, N-(γ-n.-butoxy-carbonyl-n.propyl)-carbazole, N-(β-ethoxy-carbonyloxy-ethyl)-carbazole and N-(β-phenoxy-carbonyl-ethyl)-carbazole.

In the process of the present invention diazotised heterocyclic amines of aromatic character of the thiazole, benzthiazole, benzisothiazole, thiadiazole, triazole and thiophene series, which can optionally also contain further substituents in the aromatic nucleus, are preferred in addition to the diazotised amines of the general formulas I and II.

Examples which may be mentioned are the following heterocyclic amines: 2-amino-4-methyl-thiazole, 2-amino-4,5-dimethylthiazole 2-amino-5-nitro-thiazole, 2-amino-4-methyl-5-nitro-thiazole, 2-amino-4-cyano-5-nitro-thiazole, 2-amino-4-trifluoromethyl-5-nitro-thiazole, 2-amino-4-phenyl-5-nitrothiazole, 2-amino-benzthiazole, 2-amino-6-methoxy-benzthiazole, 2-amino-6-ethoxy-benzthiazole, 2-amino-5-methoxy-6-ethoxybenzthiazole, 2-amino-6-chloro-benzthiazole, 2-amino-4-nitrobenzthiazole, 2-amino-6-nitro-benzthiazole, 2-amino-6methylsulphonyl-benzthiazole, 3-amino-2,1-benzisothiazole, 3-amino-5-nitro-2,1-benzisothiazole, 3-amino-5-nitro-7-chloro-2,1-benzisothiazole, 3-amino-7-nitro-benzisothiazole, 2-amino-5-phenyl-1,3,4-thiadiazole, 2-amino-4-phenyl-1,3,5-thiadiazole, 2-amino-1,3,4-triazole, 2-amino-5-methylsulphonyl-1,3,4-triazole, 2-amino-5-bromo-thiophene, 2-amino-5-cyano-thiophene, 2-amino-5-nitro-thiophene, 2-amino-4-methyl-5-nitro-thiophene, 2-amino-3-nitro-thiophene, 2-amino-3-cyano-5-nitro-thiophene, 2-amino-5-nitro-thiophene-3-carboxylic acid ethyl ester and 2-amino-3-cyano-thiophene.

The diazotised heterocyclic amines of aromatic character of the thiazole, benzthiazole, benzisothiazole, thiadiazole, triazole and thiophene series are preferably coupled with tertiary aromatic amines of the general formula III, especially with tertiary aromatic amines of the general formula VI

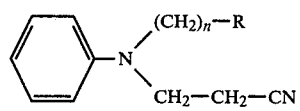

wherein R denotes a phenyl radical which is optionally monosubstituted or disubstituted by halogen atoms, in particular chlorine atoms, or alkyl or alkoxy groups containing 1 to 4 C atoms and n denotes the numbers 1 or 2.

Examples of coupling components of this type are: N-benzyl-N-cyanoethylaniline, N-(2'-chloro-benzyl)-N-cyano-ethyl-aniline, N-(4'-methyl-benzyl)-N-cyanoethyl-aniline, N-(4'-ethyl-benzyl)-N-cyanoethyl-aniline, N-(2',4'-di-n-butyl-benzyl)-N-cyanoethyl-aniline, N-(2'methoxy-benzyl)-N-cyanoethyl-aniline, N-phenethyl-N-cyanoethyl-aniline, N-(2'-chloro-phenethyl)-N-cyanoethyl-aniline, N-(2'-bromo-phenethyl)-N-cyanoethyl-aniline, N-(2',4'-dichloro-phenethyl)-N-cyanoethyl-aniline, N-(4'-methyl-phenethyl)-N-cyanoethyl-aniline, N-(4'-n-butyl-phenethyl)-N-cyanoethyl-aniline, N-(2',4'-dimethyl-phenethyl)-N-cyanoethyl-aniline, N-(3'-methoxyphenethyl)-N-cyanoethyl-aniline, N-(4'-methoxy-phenethyl)-N-cyanoethyl-aniline, N-(4'-n-butoxy-phenethyl)-N-cyanoethyl-aniline and N-(2',4'-dimethoxy-phenethyl)-N-cyanoethyl-aniline.

The process according to the invention is particularly suitable for carrying out the coupling of the diazonium compound of an amine of the general formula VII

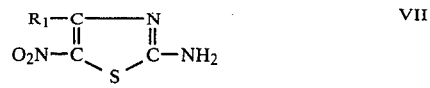

wherein $R_1$ denotes a hydrogen atom or a methyl, cyano or trifluoromethyl group, or of the general formula VIII

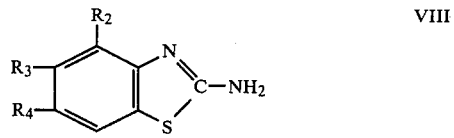

wherein $R_2$ denotes a hydrogen atom or a nitro group, $R_3$ denotes a hydrogen atom or a methoxy group, $R_4$ denotes a hydrogen or chlorine atom or a methoxy, ethoxy, nitro or methylsulphonyl group, with a coupling component of the general formula III, especially with a coupling component of the general formula VI.

The azo dye produced by the process of the present invention in a good yield and state of purity can either be separated out by driving off, by means of steam, the aliphatic alcohol used as solvent or can be isolated by immediate filtration and, if appropriate, subsequent washing. By using the alkanol of the reaction medium for such washing, the washings can be combined with the filtrate and readily subjected to alkanol recovery. Other washing liquids can also be used, preferably after an initial wash with the alkanol. The washing solvent can also be regenerated from the filtrate by distillation, optionally with steam.

The aliphatic alcohols recovered from filtrates and/or washings can be employed again in further reaction batches, giving due consideration to their water content.

The coupling process of the present invention is particularly advantageous for the manufacture of aminodisazo dyes which are only produced in a very impure form when coupling a diazotized amino-azo compound with a coupling compound in dilute aqueous mineral acid solution, with optional buffering by means of sodium acetate. It is also very helpful when using coupling compounds which are very sparingly soluble in aqueous media, such as for example N-β-phenethyl-N-β-cyanoethyl-aniline, which is coupled industrially in 50% strength sulphuric acid, a reaction medium which is to be avoided for environmental reasons, as well as with coupling compounds which couple with difficulty, such as, for example, carbazoles.

The process of the present invention makes it possible to manufacture azo dyes industrially in a simple manner and in a high yield and state of purity from these diazo components and coupling components.

Preferred halogen atoms for $X^1$ to $X^7$ are chlorine and bromine.

The Process of the present invention is especially suited for preparing the following dyestuffs:

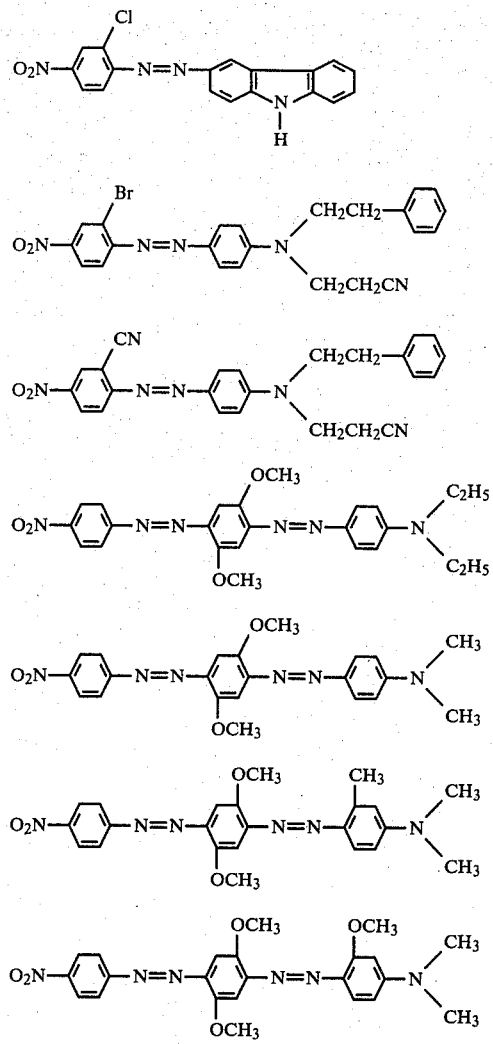

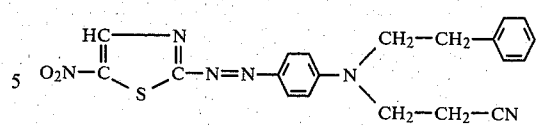

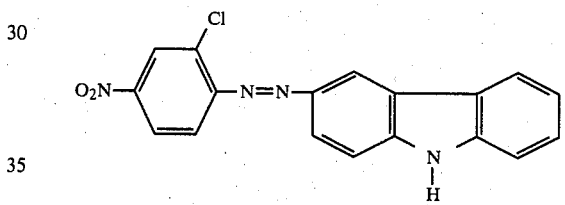

EXAMPLE 1

A suspension of 43.0 parts by weight of 2-chloro-4-nitroaniline in 475.0 parts by weight of water and 86.5 parts by weight of technical hydrochloric acid (D=1.153) is diazotized, at 0° to +5° C. with external cooling, using a solution of 19.3 parts by weight of sodium nitrite in 62.5 parts by weight of water. The filtered diazo solution is then run into a suspension of 43.8 parts by weight of carbazole in 400.0 parts by weight of n-butanol at 40° C. After approximately 8 hours of stirring, a spot test shows no residual diazonium content. The mixture is then stirred overnight at 40° C. The dye which has precipitated is then filtered off and is well rinsed on the filter, first with 160.0 parts by weight of n-butanol at room temperature and then with water, and is dried. It is an orange powder which dissolves in concentrated sulphuric acid to give a red-violet color which changes to red on standing. 72.0 parts by weight of the dye of the formula are obtained. This has a purity of 99.4%, determined by comparison of physical measurements against a crystallized sample.

If the n-butanol is removed from the coupling batch by steam distillation and if the dye which has precipitated is subsequently filtered off, rinsed with hot water and dried, 82.6 parts by weight of dye having a degree of purity of 86.0% are obtained.

Dyes were prepared by the same procedure, using the materials listed in Table 1 with as good or better results.

TABLE 1

| No. | Diazo component | Coupling component | Solvent |
|---|---|---|---|
| 1. | $O_2N$—⟨ ⟩—$NH_2$ (Br) | carbazole (NH) | n-butanol |
| 2. | $O_2N$—⟨ ⟩—$NH_2$ | " | " |
| 3. | $Cl$—⟨ ⟩—$NH_2$ | " | " |
| 4. | $O_2N$—⟨ ⟩—$NH_2$ (Cl) | carbazole (N-$C_2H_5$) | isobutanol |

TABLE 1-continued

| No. | Diazo component | Coupling component | Solvent |
|---|---|---|---|
| 5. | 3-Br, 4-NH$_2$, 1-O$_2$N-benzene | 9-(n-C$_4$H$_9$)-carbazole | " |
| 6. | 3-Cl, 4-NH$_2$, 1-O$_2$N-benzene | 9-(CH$_2$CH$_2$OH)-carbazole | " |
| 7. | 3-Br, 4-NH$_2$, 1-O$_2$N-benzene | 9-(CH$_2$CH$_2$CN)-carbazole | n-butanol |
| 8. | 3-O$_2$N, 4-NH$_2$, 1-H$_3$C-benzene | 9-(CH$_2$CH$_2$-O-CO-CH$_3$)-carbazole | " |
| 9. | 3-H$_3$C, 4-NH$_2$, 1-O$_2$N-benzene | 9-(CH$_2$CH$_2$-O-CO-C$_3$H$_7$(n))-carbazole | " |
| 10. | 3-H$_3$CO, 4-NH$_2$, 1-O$_2$N-benzene | 9-(CH$_2$CH$_2$-C$_6$H$_5$)-carbazole | " |
| 11. | 3-O$_2$N, 4-NH$_2$, 1-H$_5$C$_2$O-benzene | 9-(CH$_2$CH$_2$-C$_6$H$_4$-OCH$_3$)-carbazole | " |
| 12. | 4-NH$_2$-NC-benzene | 9-(CH$_2$CH$_2$-CO-OC$_2$H$_5$)-carbazole | " |
| 13. | 3-H$_3$C, 4-NH$_2$, 1-NC-benzene | 9-(CH$_2$CH$_2$-CO-O-C$_6$H$_5$)-carbazole | " |
| 14. | 3-Cl, 4-NH$_2$, 1-NC-benzene | 9-(CH$_2$CH$_2$-O-CO-OC$_2$H$_5$)-carbazole | " |
| 15. | 3-Cl, 4-NH$_2$, 1-O$_2$N-benzene | 9-CH$_3$-carbazole | " |
| 16. | 4-NH$_2$-H$_3$C-O$_2$S-benzene | carbazole (N-H) | " |
| 17. | 2-NH$_2$-H$_3$C-O$_2$S-benzene | 9-(CH$_2$CH$_2$CH$_3$)-carbazole | " |

TABLE 1-continued

| No. | Diazo component | Coupling component | Solvent |
|---|---|---|---|
| 18. | O₂N—⟨Br⟩—NH₂ (3-Br, 4-NH₂, with O₂N) | carbazole-N-CH₂-CH(OH)-CH₃ | " |

EXAMPLE 2

16.3 parts by weight of 2-cyano-4-nitroaniline are introduced at 0° to +5° C. into a solution of nitrosylsulphuric acid which has been prepared by warming 7.7 parts by weight of sodium nitrite in 140.0 parts by weight of 66° Be sulphuric acid at 70° C. for one hour, and diazotization is carried out at this temperature by stirring for a further two hours. This diazo solution is then run, at 0° to +5° C., into a suspension of 25.1 parts by weight of N-β-phenethyl-N-β-cyanoethyl-aniline in 200.0 parts by weight of isobutanol and 500.0 parts by weight of water. There is a negative diazo test within one hour of stirring.

The isobutanol is driven off from the coupling batch by steam distillation and the dye which has precipitated is filtered off, rinsed with water and dried. It is a red powder which dissolves in concentrated sulphuric acid to give a yellowish-tinged brown color. 39.5 parts by weight of dye of the formula

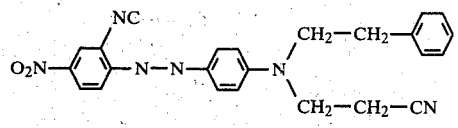

are obtained. This has a purity of 94.5% determined by a comparison of physical measurements against a crystallized sample.

Dyes were also prepared using the materials listed in Table 2 by the process described in the preceding text.

TABLE 2

| No. | Diazo component | Coupling component | Solvent |
|---|---|---|---|
| 1. | 2,4-dinitroaniline (O₂N, O₂N, NH₂) | C₆H₅-N(CH₂CH₂-C₆H₅)(CH₂CH₂-CN) | isobutanol |
| 2. | 2-nitro-4-nitro-6-bromoaniline (O₂N, O₂N, NH₂, Br) | " | " |
| 3. | 2-methylsulfonyl-4-nitroaniline (H₃C—O₂S, O₂N, NH₂) | " | " |
| 4. | 2,6-dichloro-4-nitroaniline (Cl, O₂N, NH₂, Cl) | " | " |
| 5. | 2-chloro-4-nitro-6-bromoaniline (Cl, O₂N, NH₂, Br) | " | " |
| 6. | 2-methylsulfonyl-4-nitro-6-bromoaniline (H₃C—O₂S, O₂N, NH₂, Br) | " | " |
| 7. | 2-cyano-4-nitroaniline (NC, O₂N, NH₂) | C₆H₅-N(CH₂-C₆H₅)(CH₂-CH₂-CN) | n-butanol |
| 8. | 2-cyano-4-nitroaniline (NC, O₂N, NH₂) | C₆H₅-N(CH₂-C₆H₅)(CH₂-CH₃) | " |

TABLE 2-continued

| No. | Diazo component | Coupling component | Solvent |
|---|---|---|---|
| 9. | 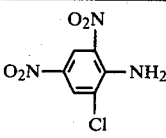 | 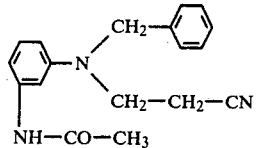 | " |
| 10. | 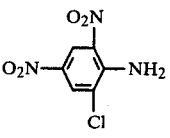 | 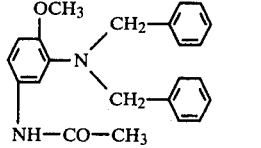 | " |
| 11. | 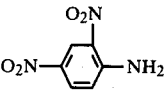 | 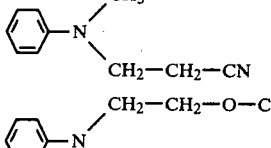 | " |
| 12. | 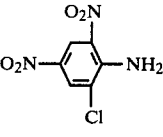 | 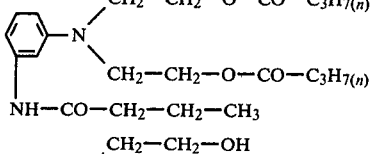 | iso-butanol |
| 13. | 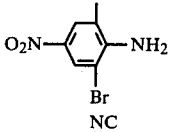 | 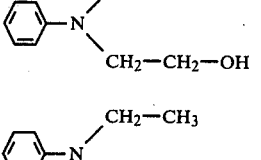 | n-butanol |
| 14. |  | 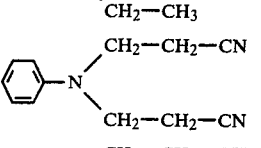 | isobutyl carbinol |
| 15. |  | 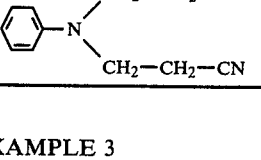 | isobutyl carbinol |
| 16. | 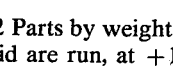 | 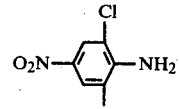 | n-butanol |

EXAMPLE 3

34.2 Parts by weight of 42% strength nitrosylsulphuric acid are run, at +15° C., into a suspension of 16.3 parts by weight of 2-cyano-4-nitroaniline in 100.0 parts by weight of glacial acetic acid. After stirring for a further hour, the diazo solution is run into a stirred suspension of 26.2 parts by weight of N-β-phenethyl-N-β-cyanoethyl-aniline in 160.0 parts by weight of isobutyl alcohol and 50.0 parts by weight of water. There is a negative diazo test within one hour. The dye which has precipitated is filtered off, rinsed first with 80.0 parts by weight of isobutanol at room temperature and then with water, and dried. 38.7 parts by weight of dye corresponding to the formula of Example 2 are obtained. The dye has a purity of 99.8%, determined by a comparison of physical measurements against a crystallized sample.

Dyes were also prepared with this procedure using the materials listed in Table 3.

TABLE 3

| No. | Diazo component | Coupling component | Solvent |
|---|---|---|---|
| 1. | 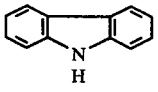 | 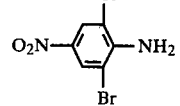 | n-butanol |
| 2. | O₂N—⟨ring, Cl, Br⟩—NH₂ | " | " |

TABLE 3-continued

| No. | Diazo component | Coupling component | Solvent |
|---|---|---|---|
| 3. | 2,4-dinitro-3,6-dibromoaniline (Br, O₂N, NH₂, Br) | " | " |
| 4. | 2,4,6-trinitroaniline (O₂N, O₂N, NH₂) | " | " |
| 5. | 2,4-dinitro-6-chloroaniline (O₂N, O₂N, NH₂, Cl) | " | " |
| 6. | 2-cyano-4-nitroaniline (NC, O₂N, NH₂) | " | " |
| 7. | 2-methylsulfonyl-4-nitro-6-nitrotoluene (H₃C—O₂S, O₂N) | " | " |
| 8. | 2,4-dinitroaniline (O₂N, O₂N, NH₂) | N-ethylcarbazole (C₂H₅) | " |
| 9. | 2-cyano-4-nitroaniline (NC, O₂N, NH₂) | " | " |
| 10. | 2,4-dinitroaniline (O₂N, O₂N, NH₂) | N-(2-hydroxyethyl)carbazole (CH₂—CH₂—OH) | isobutanol |
| 11. | 2-cyano-4-nitroaniline (NC, O₂N, NH₂) | " | " |
| 12. | 2,4-dinitro-6-bromoaniline (O₂N, O₂N, NH₂, Br) | 3-(N,N-diethylamino)acetanilide (CH₂—CH₃, N, CH₂—CH₃, NH—CO—CH₃) | n-pentanol |
| 13. | 2,4-dinitro-6-chloroaniline (O₂N, O₂N, NH₂, Cl) | 2-methoxy-5-acetamido-N,N-diethylaniline (OCH₃, CH₂—CH₃, N, CH₂—CH₃, NH—CO—CH₃) | n-hexanol |
| 14. | 2,4-dinitro-6-chloroaniline (O₂N, O₂N, NH₂, Cl) | (CH₂—CH₃, N, CH₂—CH₃, NH—CO—CH—CH₂—CH₂—CH₂—CH₃, C₂H₅) | " |
| 15. | 2,4-dinitro-6-chloroaniline (O₂N, O₂N, NH₂, Cl) | (OCH₃, CH₂—CH₂—O—CO—CH₃, N, CH₂—CH₂—O—CO—CH₃, NH—CO—CH₃) | n-butanol |
| 16. | 2,4-dinitro-6-chloroaniline (O₂N, O₂N, NH₂, Cl) | (OC₂H₅, CH₂—CH₂—O—CO—CH₃, N, CH₂—CH₂—O—CO—CH₃, NH—CO—CH₃) | " |

TABLE 3-continued

| No. | Diazo component | Coupling component | Solvent |
|---|---|---|---|
| 17. | 2,4-dinitro-5-bromoaniline | 2-OCH₃-5-(NH-CO-CH₃)-C₆H₃-N(CH₂-CH₂-O-CO-CH₃)(CH₂-CH₂-CN) | " |
| 18. | 2,4-dinitro-5-bromoaniline | 2-OCH₃-5-(NH-CO-CH₃)-C₆H₃-N(CH₂-CH₂-O-CO-OCH₃)₂ | " |
| 19. | 2-amino-4-nitro-5-bromo-1-methylsulfonylbenzene | 3-(NH-CO-CH₃)-C₆H₄-N(CH₂-CH₃)₂ | isobutanol |
| 20. | 2,4-dinitro-6-bromoaniline | 3-(NH-CO-CH₃)-C₆H₄-N(CH₂-CH₃)₂ | " |
| 21. | 2,4-dinitro-6-chloroaniline | 3-CH₃-C₆H₄-N(CH₂-CH₂-CH₂-O-CO-C₃H₇(n))₂ | " |
| 22. | (n)H₉C₄-HC(C₂H₅)-CH₂-HN-O₂S-C₆H₄-NH₂ | 2-OCH₃-5-CH₃-C₆H₃-N(CH₃)₂ | n-hexanol |
| 23. | 4-[(H₃C)₂N-OC]-C₆H₄-NH₂ | 2-OCH₃-5-Cl-C₆H₃-N(CH₂-CH₂-OH)₂ | n-butanol |
| 24. | 3-[(H₅C₂)₂N-OC]-C₆H₄-NH₂ | 2-OCH₃-5-OCH₃-C₆H₃-N(CH₂-CH₃)₂ | " |
| 25. | 2-methyl-5-sulfamoylaniline | 2-OCH₃-5-CH₃-C₆H₃-N(CH₂-CH₃)₂ | " |
| 26. | 2-methoxy-5-[(H₃C)₂N-O₂S]-aniline | 3-OCH₃-C₆H₄-N(CH₂-CH₃)₂ | " |
| 27. | 4-[(H₃C)₂N-O₂S]-C₆H₄-NH₂ | 3-CH₃-C₆H₄-N(CH₃)₂ | " |
| 28. | 3-(H₃C-OC)-C₆H₄-NH₂ | C₆H₅-N(CH₂-CH₂-OH)₂ | " |

TABLE 3-continued

| No. | Diazo component | Coupling component | Solvent |
|---|---|---|---|
| 29. | phenyl-C(=O)-C6H4-NH2 | 3-(N(CH2-CH3)2)-C6H4-NH-CO-CH3 | " |
| 30. | 2,4-(H3C)2-C6H3-C(=O)-C6H4-NH2 | 2-OCH3-5-CH3-C6H3-N(CH2-CH2-OH)2 | diethyl carbinol |
| 31. | 4-H3C-C6H4-C(=O)-C6H4-NH2 | 3-(N(CH2-CH3)2)-C6H4-NH-CO-CH3 | isobutanol |
| 32. | 4-(n)H9C4-C6H4-C(=O)-C6H4-NH2 | 3-(N(CH2-CH3)2)-C6H4-NH-CO-CH3 | " |
| 33. | 4-H3CO-C6H4-C(=O)-C6H4-NH2 | C6H5-N(C2H5)2 | " |
| 34. | 4-Cl-C6H4-C(=O)-C6H4-NH2 | C6H5-N(CH2-CH2-OH)2 | " |
| 35. | 3-Cl-4-NH2-C6H3-C(=O)-C6H5 | 2-OCH3-5-(NH-CO-CH3)-C6H3-N(CH2-CH3)2 | " |
| 36. | 3-NH2-4-CH3-C6H3-C(=O)-C6H5 | 3-(N(CH2-CH3)2)-C6H4-NH-CO-CH3 | " |
| 37. | 2-CH3-3-NH2-4-CH3-... -C(=O)-C6H5 | 3-(N(CH2-CH2-OH)2)-C6H4-NH-CO-CH3 | " |
| 38. | 2-NH2-3-OCH3-... -C(=O)-C6H5 | 3-(N(CH2-CH3)2)-C6H4-NH-CO-CH3 | n-butanol |
| 39. | 2-NH2-5-CH3-C6H3-C(=O)-C6H5 | C6H5-N(CH2-CH2-O-CO-CH3)2 | " |
| 40. | 4-(C6H5-O2S)-C6H4-NH2 | 3-(N(CH2-CH3)2)-C6H4-NH-CO-CH3 | " |

TABLE 3-continued

| No. | Diazo component | Coupling component | Solvent |
|---|---|---|---|
| 41. | 3-Cl-4-(phenylsulfonyl)aniline | 3-(N,N-diethylamino)acetanilide | " |
| 42. | 4-amino-4'-methyldiphenylsulfone | 2,5-dimethoxy-N,N-diethylaniline | " |
| 43. | 4-amino-4'-(n-butyl)diphenylsulfone | 2,5-dimethoxy-N,N-diethylaniline | " |
| 44. | 4-amino-4'-methoxydiphenylsulfone | 2,5-dimethoxy-N,N-diethylaniline | " |
| 45. | 5-Cl-2-(phenylsulfonyl)aniline | 3-(N,N-diethylamino)acetanilide | " |
| 46. | 5-methyl-2-(phenylsulfonyl)aniline | 3-(N,N-diethylamino)acetanilide | " |
| 47. | 4-phenoxyaniline | N,N-diethylaniline | " |
| 48. | 4-phenoxy-2-nitroaniline | N,N-diethylaniline | isobutanol |
| 49. | 4-phenoxy-2-nitroaniline | N,N-diethylaniline | n-pentanol |
| 50. | 4-(4-methylphenoxy)-2-nitroaniline | N,N-bis(2-hydroxyethyl)aniline | " |
| 51. | 4-(4-n-butoxyphenoxy)-2-nitroaniline | N,N-bis(2-hydroxyethyl)aniline | n-hexanol |
| 52. | 4-benzylaniline | 3-(N,N-diethylamino)acetanilide | n-butanol |

EXAMPLE 4

70.0 Parts by weight of technical hydrochloric acid (D=1.153) are run, at 0° to +5° C. and in the course of one hour, into a stirred mixture of 320.0 parts by weight of isobutanol, 100.0 parts by weight of water, 55.0 parts by weight of N-3-phenethyl-N-3-cyanoethyl-aniline, 43.4 parts by weight of 2-bromo-4-nitroaniline and 15.4 parts by weight of sodium nitrite. Within one hour the test for residual diazonium compound is negative. The mixture is subsequently stirred overnight at a temperature which rises to room temperature. The dye which has precipitated is filtered off, rinsed on the filter first with 160.0 parts by weight of isobutanol at room temperature and then with water, and dried. It is a red powder which dissolves in concentrated sulphuric acid to give a bluish-tinged red color. 90.8 parts by weight of dye of the formula

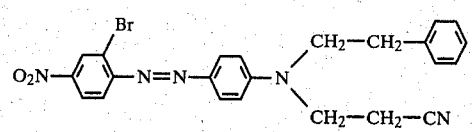

are obtained. This has a purity of 92.0%, determined by a comparison of physical measurements against a crystallised sample. The resulting dyestuff is obtained in a similar yield and in a similar purity if the isobutanol is driven off from the coupling batch by steam distillation before the dyestuff is filtered off.

Dyestuffs were also prepared using the materials listed in Table 4 by the process described in the preceding text.

TABLE 4

| No. | Diazo component | Coupling component | Solvent |
|---|---|---|---|
| 1. | 2-Cl-4-nitroaniline | N-phenyl-N-(2-phenylethyl)-N-(2-cyanoethyl)amine | n-butanol |
| 2. | 4-nitroaniline | N-phenyl-N-(2-phenylethyl)-N-(2-cyanoethyl)amine | " |
| 3. | 2-Br-4-nitroaniline | N-phenyl-N-[2-(4-methylphenyl)ethyl]-N-(2-cyanoethyl)amine | " |
| 4. | 2-Br-4-nitroaniline | N-phenyl-N-benzyl-N-(2-cyanoethyl)amine | " |
| 5. | aniline | N,N-dimethyl-3-cyanoaniline | n-hexanol |
| 6. | 2,5-dichloroaniline | N,N-diethylaniline | " |
| 7. | 4-(n-butoxy)aniline | N,N-diethyl-3-methylaniline | isohexanol |
| 8. | 4-methylaniline | N,N-bis(2-cyanoethyl)aniline | isobutyl carbinol |
| 9. | 4-methoxyaniline | N-ethyl-N-(2-cyanoethyl)aniline | isobutyl carbinol |
| 10. | 4-phenoxyaniline | N-methyl-N-(2-cyanoethyl)-3-methoxyaniline | n-butanol |
| 11. | 2,5-dimethoxyaniline | N,N-bis(2-hydroxyethyl)aniline | " |
| 12. | 2-ethoxy-5-chloroaniline | N-(2-cyanoethyl)-N-(2-hydroxyethyl)aniline | " |

TABLE 4-continued

| No. | Diazo component | Coupling component | Solvent |
|---|---|---|---|
| 13. | H₂N—OC—C₆H₄—NH₂ (para) | C₆H₅—N(CH₂—CH₂—CN)(CH₂—CH₂—O—CO—CH₃) | " |
| 14. | (n)H₉C₄—HC(C₂H₅)—H₂C—HN—OC—C₆H₄—NH₂ (meta) | C₆H₅—N(CH₂—CH₂—O—CO—CH₃)₂ | " |
| 15. | 4-H₃C, 2-O₂N-C₆H₃—NH₂ | 3-CH₃-C₆H₄—N(CH₃)(CH₂—C₆H₅) | " |
| 16. | H₅C₂O—OC—C₆H₄—NH₂ (para) | C₆H₅—N-morpholine | " |
| 17. | (n)H₉C₄O—OC—C₆H₄—NH₂ (para) | 3-CH₃-C₆H₄—N-morpholine | " |
| 18. | (n)H₉C₄—HC(C₂H₅)—H₂C—O—OC—C₆H₄—NH₂ (para) | 3-OCH₃-C₆H₄—N-morpholine | " |
| 19. | H₂N—O₂S—C₆H₄—NH₂ (para) | 2-Cl-C₆H₄—N(CH₃)₂ | " |
| 20. | (n)H₉C₄—HN—OC—C₆H₄—NH₂ (meta) | 2-CH₃-C₆H₄—N(CH₃)₂ | " |
| 21. | H₃C—OC—C₆H₄—NH₂ (para) | C₆H₅—N(CH₂—CH₂—CO—OC₂H₅)(CH₂—CH₃) | isobutanol |
| 22. | 2-Cl, 4-H₃C—O₂S-C₆H₃—NH₂ | 3-CH₃-C₆H₄—N(CH₂—CH₂—O—CO—CH₃)₂ | " |
| 23. | 3-H₃C—OC-C₆H₄—NH₂ | C₆H₅—N(CH₂—CH₂—O—CO—OC₂H₅)(CH₂—CH₃) | " |
| 24. | 2,4,6-Cl₃-C₆H₂—NH₂ | C₆H₅—N(CH₂—CH₂—CH₂—CO—O—C₆H₅)(CH₂—CH₃) | " |
| 25. | 2-H₃C, 4-Cl-C₆H₃—NH₂ | C₆H₅—N(CH₂—CH₂—O—C₆H₅)(CH₂—CH₃) | " |
| 26. | 3-O₂N-C₆H₄—NH₂ | C₆H₅—N(CH₂—CH₂—C₆H₄—Cl(p))(CH₂—CH₂—CN) | " |
| 27. | 2-O₂N-C₆H₄—NH₂ | C₆H₅—N(CH₂—CH₂—C₆H₄—C₄H₉(n))(CH₂—CH₃) | " |

TABLE 4-continued

| No. | Diazo component | Coupling component | Solvent |
|---|---|---|---|
| 28. | 3,5-bis(trifluoromethyl)aniline (F₃C, F₃C, NH₂) | N-(4-methoxybenzyl)-N-(2-cyanoethyl)aniline | " |
| 29. | 3-chloro-4-(ethoxycarbonyl)aniline (H₅C₂O—OC, Cl, NH₂) | N-methyl-N-(2-cyclohexylethyl)aniline | " |
| 30. | 4-chloro-2-(ethoxycarbonyl)aniline (H₅C₂O—OC, Cl, NH₂) | 2-methoxy-N,N-dipropylaniline (OCH₃) | " |
| 31. | 4-(n-butyl)aniline ((n)H₉C₄—NH₂) | N,N-diethylaniline | " |

EXAMPLE 5

417.7 Parts by weight of the zinc chloride double salt of diazotized 4-amino-3,6-dimethoxy-4'-nitro-azo-benzene of the formula

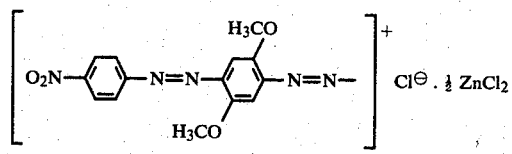

(a commercially available product) are introduced, in the course of half an hour and at 0 to +5° C., into a stirred suspension of 4000.0 parts by weight of water, 1,600.0 parts by weight of n-butanol, 179.0 parts by weight of N,N-diethyl-aniline and 328.0 parts by weight of sodium acetate. After 3 hours there is a negative spot test for residual diazonium compound. The mixture is subsequently stirred overnight at a temperature which rises to room temperature. The coupling batch is then warmed at 90° for one hour. The resulting dye that precipitates is filtered off, rinsed first with 1,600.0 parts by weight of n-butanol at 90° C., and then with water, and dried. It is a black powder which dissolves in concentrated sulphuric acid to give a blue color. 442.0 g of dye of the formula

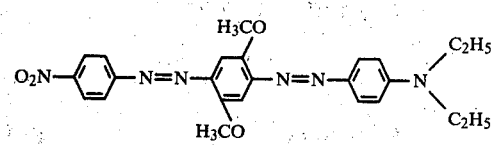

are obtained. This has a purity of 95.6%, determines by a comparison of physical measurements against a crystallized sample.

Substituting the materials listed in Table 5 in the process (using zinc chloride double salts of the diazotized amino-azo compounds), gives similar results.

TABLE 5

| No. | Amino-azo compound | Coupling component | Solvent |
|---|---|---|---|
| 1. | O₂N—C₆H₃(NC)—N=N—C₆H₂(H₃CO)(H₃C)—NH₂ | N,N-diethylaniline | n-butanol |
| 2. | O₂N—C₆H₃(O₂N)—N=N—C₆H₂(H₃CO)(H₃C)—NH₂ | N,N-diethylaniline | " |
| 3. | O₂N—C₆H₃(NC)—N=N—C₆H₂(H₃C)(H₃C)—NH₂ | N,N-diethylaniline | " |
| 4. | O₂N—C₆H₃(O₂N)—N=N—C₆H₂(H₃C)(H₃C)—NH₂ | N,N-diethylaniline | " |

TABLE 5-continued
| No. | Amino-azo compound | Coupling component | Solvent |
|---|---|---|---|
| 5. | 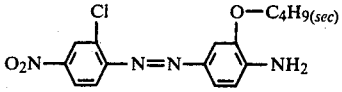 | 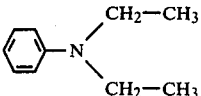 | " |
| 6. | 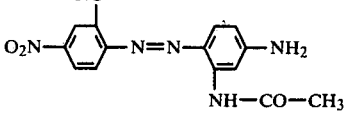 | 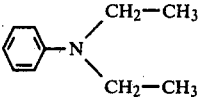 | " |
| 7. | 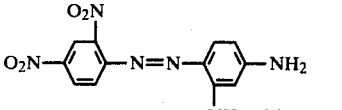 | 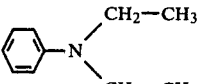 | " |
| 8. | 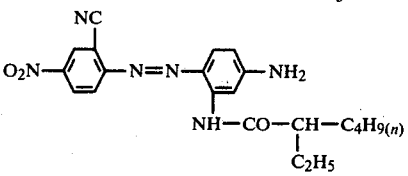 | 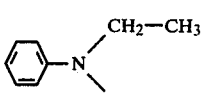 | " |
| 9. | 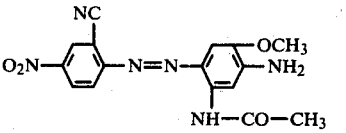 | 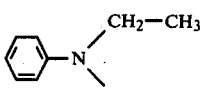 | " |
| 10. | 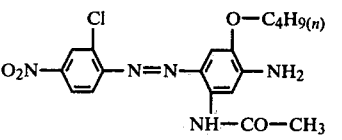 | 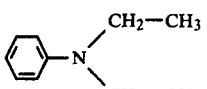 | " |
| 11. | 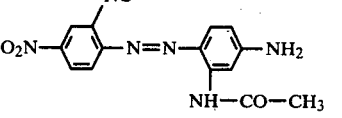 | 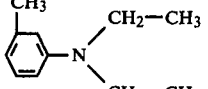 | " |
| 12. | 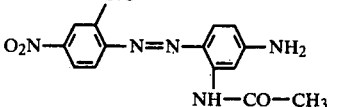 | 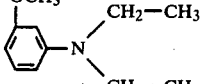 | " |
| 13. | 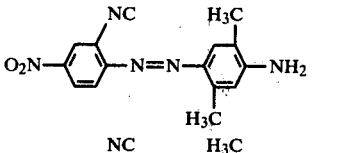 | 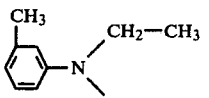 | " |
| 14. | 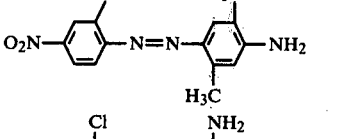 | 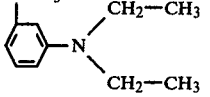 | " |
| 15. | 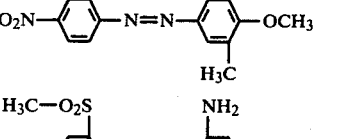 | 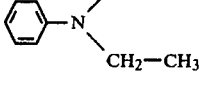 | " |
| 16. | 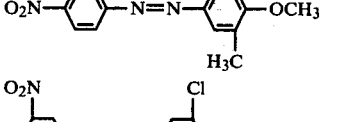 | 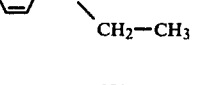 | " |
| 17. | 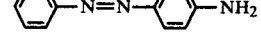 | 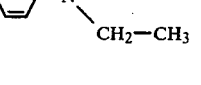 | isobutanol |

TABLE 5-continued

| No. | Amino-azo compound | Coupling component | Solvent |
|---|---|---|---|
| 18. | 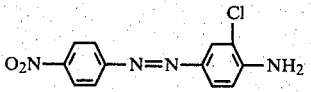 4-O$_2$N-C$_6$H$_4$-N=N-(2-Cl,4-NH$_2$)C$_6$H$_3$ | 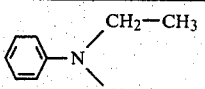 C$_6$H$_5$-N(CH$_2$-CH$_3$)$_2$ | " |
| 19. | 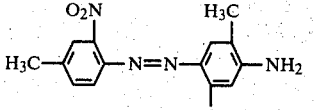 (2-O$_2$N,4-H$_3$C)C$_6$H$_3$-N=N-(3-H$_3$C,4-NH$_2$)C$_6$H$_3$ | 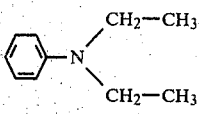 C$_6$H$_5$-N(CH$_2$-CH$_3$)$_2$ | n-butanol |
| 20. | 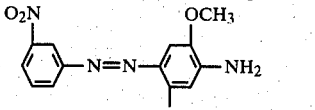 3-O$_2$N-C$_6$H$_4$-N=N-(2-OCH$_3$,4-NH$_2$,5-OCH$_3$)C$_6$H$_2$ | 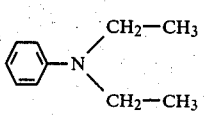 C$_6$H$_5$-N(CH$_2$-CH$_3$)$_2$ | " |
| 21. | 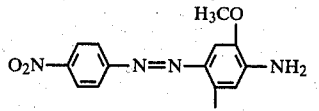 4-O$_2$N-C$_6$H$_4$-N=N-(2-H$_3$CO,4-NH$_2$,5-OCH$_3$)C$_6$H$_2$ | 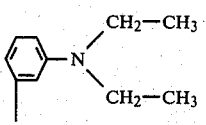 3-(NH-CO-CH$_3$)-C$_6$H$_4$-N(CH$_2$-CH$_3$)$_2$ | " |
| 22. | 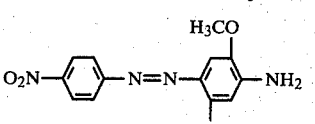 4-O$_2$N-C$_6$H$_4$-N=N-(2-H$_3$CO,4-NH$_2$,5-OCH$_3$)C$_6$H$_2$ | 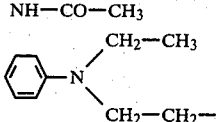 C$_6$H$_5$-N(CH$_2$-CH$_3$)(CH$_2$-CH$_2$-OH) | " |
| 23. | 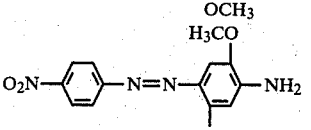 4-O$_2$N-C$_6$H$_4$-N=N-(2-H$_3$CO,4-NH$_2$,5-OCH$_3$)C$_6$H$_2$ | 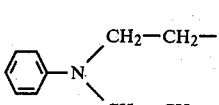 C$_6$H$_5$-N(CH$_2$-CH$_2$-CN)(CH$_2$-CH$_2$-OH) | " |
| 24. | 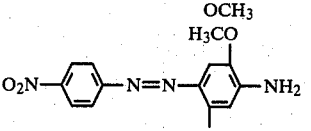 4-O$_2$N-C$_6$H$_4$-N=N-(2-H$_3$CO,4-NH$_2$,5-OCH$_3$)C$_6$H$_2$ | 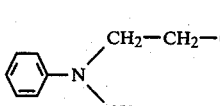 C$_6$H$_5$-N(CH$_2$-CH$_2$-OH)$_2$ | " |
| 25. | 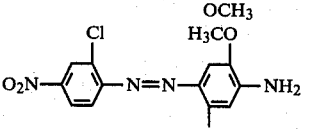 (2-Cl,4-O$_2$N)C$_6$H$_3$-N=N-(2-H$_3$CO,4-NH$_2$,5-OCH$_3$)C$_6$H$_2$ | 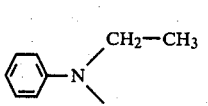 C$_6$H$_5$-N(CH$_2$-CH$_3$)$_2$ | " |
| 26. | 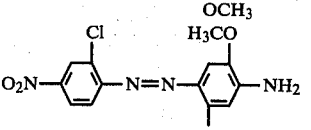 (2-Cl,4-O$_2$N)C$_6$H$_3$-N=N-(2-H$_3$CO,4-NH$_2$,5-OCH$_3$)C$_6$H$_2$ | 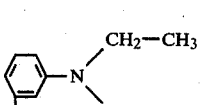 3-(NH-CO-CH$_3$)-C$_6$H$_4$-N(CH$_2$-CH$_3$)$_2$ | " |
| 27. | 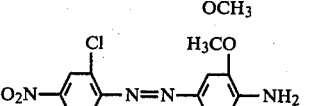 (2,5-Cl$_2$,4-O$_2$N)C$_6$H$_2$-N=N-(2-H$_3$CO,4-NH$_2$,5-OCH$_3$)C$_6$H$_2$ | 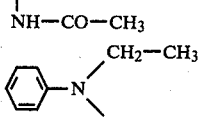 C$_6$H$_5$-N(CH$_2$-CH$_3$)$_2$ | " |
| 28. | 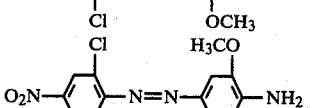 (2,5-Cl$_2$,4-O$_2$N)C$_6$H$_2$-N=N-(2-H$_3$CO,4-NH$_2$,5-OCH$_3$)C$_6$H$_2$ | 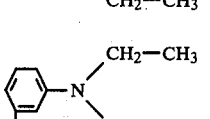 3-(NH-CO-CH$_3$)-C$_6$H$_4$-N(CH$_2$-CH$_3$)$_2$ | " |

EXAMPLE 6

The dye of Example 5 can also be prepared in the following way: 13.8 parts by weight of 4-nitro-aniline in 300.0 parts by weight of water and 34.6 parts of weight of technical hydrochloric acid (D=1.153) are diazotized at 0° to +5° C. with a solution of 7.1 parts by weight of sodium nitrite in 50.0 parts by weight of water. After destroying excess sodium nitrite with a 25% strength solution of sulphamic acid, the filtered diazo solution is run, at 0° to +5° C., with external cooling, into a solution of 15.8 parts by weight of aminohydroquinone dimethyl ether in 625.0 parts by weight of water and 11.5 parts by weight of technical hydrochloric acid (D=1.153). The coupling is complete after one hour. After stirring for a further three hours, 80.0 parts by weight of 33°. Be sodium hydroxide solution are stirred into the coupling batch in order to remove byproducts formed. The mixture is subsequently stirred overnight at a temperature which rises to room temperature. The resulting amino-azo dye of the formula

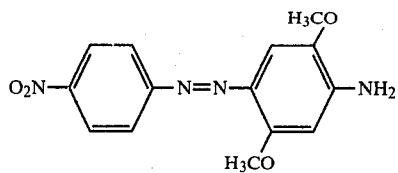

is then filtered off, rinsed with water and dried.

A solution of 5.3 parts by weight of sodium nitrite in 50.0 parts by weight of water is run, at 18° to 20° C. and in the course of one hour, into a stirred suspension of 15.0 parts by weight of the thus-formed amino-azo dye in 850.0 parts by weight of water and 17.3 parts by weight of technical hydrochloric acid (D=1.153). This diazotization batch is stirred for a further 1½ hours at room temperature and is then warmed at 50° C. for one hour. The filtered diazo solution is then run at 0° to +5° C., into a solution of 11.2 parts by weight of N,N-diethylaniline in 320.0 parts by weight of n-butanol, in the presence of 16.4 parts by weight of sodium acetate. There is a negative test for residual diazonium compound, within one hour. The coupling batch is now warmed at 90° C. for one hour. The dye which has precipitated is filtered off, rinsed first with 80.0 parts by weight of n-butanol at 90° C. and then with water, and dried. This layer chromatography (migrating agent: benzene) shows it to be identical with the dye of Example 5.

Dyes were also similarly prepared using the materials listed in Table 6.

TABLE 6

| No. | Aminoazo compound | Coupling component | Solvent |
|---|---|---|---|
| 1. | C₆H₅—N=N—C₆H₄—NH₂ | C₆H₅—N(CH₂—CH₃)(CH₂—CH₃) | isobutanol |
| 2. | C₆H₅—N=N—C₆H₄—NH₂ | C₆H₅—N(CH₂—CH₂—OH)(CH₂—CH₂—OH) | " |
| 3. | C₆H₅—N=N—C₆H₄—NH₂ | C₆H₅—N(CH₂—CH₂—CN)(CH₂—CH₂—OH) | " |
| 4. | C₆H₅—N=N—C₆H₄—NH₂ | C₆H₄(NH—CO—CH₃)—N(CH₂—CH₃)(CH₂—CH₃) | " |
| 5. | O₂N—C₆H₄—N=N—C₆H₄—NH₂ | C₆H₅—N(CH₂—CH₃)(CH₂—CH₃) | n-butanol |
| 6. | O₂N—C₆H₄—N=N—C₆H₄—NH₂ | C₆H₄(NH—CO—CH₃)—N(CH₂—CH₃)(CH₂—CH₃) | " |
| 7. | (2-CH₃-C₆H₄)—N=N—(2-CH₃-C₆H₃)—NH₂ | C₆H₄(NH—CO—CH₃)—N(CH₂—CH₃)(CH₂—CH₃) | " |
| 8. | (iso)H₁₁C₅—C₆H₄—N=N—C₆H₄—NH₂ | C₆H₄(NH—CO—CH₃)—N(CH₂—CH₃)(CH₂—CH₃) | " |
| 9. | (n)H₉C₄—O—C₆H₄—N=N—C₆H₄—NH₂ | C₆H₄(NH—CO—CH₃)—N(CH₂—CH₃)(CH₂—CH₃) | " |
| 10. | O₂N—C₆H₄—N=N—(2-OC₂H₅-C₆H₃)—NH₂ | C₆H₅—N(CH₂—CH₃)(CH₂—CH₃) | isobutanol |

TABLE 6-continued

| No. | Aminoazo compound | Coupling component | Solvent |
|---|---|---|---|
| 11. | O₂N—⟨⟩—N=N—⟨⟩(OC₂H₅)—NH₂ | ⟨⟩—N(CH₂—CH₃)(CH₂—CH₃), NH—CO—CH₃ | " |
| 12. | H₅C₂O—OC—⟨⟩—N=N—⟨⟩—NH₂ | ⟨⟩—N(CH₂—CH₂—OH)(CH₂—CH₂—OH) | n-butanol |
| 13. | H₃C—OC—⟨⟩—N=N—⟨⟩(CH₃)(CH₃)—NH₂ | ⟨⟩—N(CH₂—CH₂—OH)(CH₂—CH₂—OH) | isobutanol |
| 14. | H₃C—OC—⟨⟩—N=N—⟨⟩(CH₃)(CH₃)—NH₂ | ⟨⟩—N(CH₂—CH₂—OH)(CH₂—CH₂—OH) | " |
| 15. | H₃C—O₂S—⟨⟩—N=N—⟨⟩(CH₃)(CH₃)—NH₂ | ⟨⟩—N(CH₂—CH₃)(CH₂—CH₃) | n-butanol |
| 16. | H₃C—O₂S—⟨⟩—N=N—⟨⟩(CH₃)(CH₃)—NH₂ | ⟨⟩—N(CH₂—CH₂—CN)(CH₂—CH₂—CN) | " |
| 17. | H₃C—O₂S—⟨⟩—N=N—⟨⟩(CH₃)(CH₃)—NH₂ | ⟨⟩—N(CH₂—CH₃)(CH₂—CH₃), NH—CO—CH₃ | " |
| 18. | O₂N—⟨⟩—N=N—⟨⟩(OCH₃)—NH₂ | ⟨⟩—N(CH₂—CH₃)(CH₂—CH₃), NH—CO—CH₃ | isobutanol |
| 19. | O₂N—⟨⟩(Cl)—N=N—⟨⟩(CH₃)—NH₂ | ⟨⟩—N(CH₂—CH₃)(CH₂—CH₃) | " |
| 20. | O₂N—⟨⟩(Cl)—N=N—⟨⟩(CH₃)—NH₂ | ⟨⟩—N(CH₂—CH₃)(CH₂—CH₃), NH—CO—CH₃ | " |

EXAMPLE 7

36.3 Parts by weight of 2-amino-5-nitro-thiazole are dissolved in 600.0 parts by weight of 65% strength sulphuric acid and diazotised with a solution of 17.9 parts by weight of sodium nitrite in 35.0 parts by weight of water at −10° C. After subsequently stirring the mixture at −10° C. for 1½ hours, the diazo solution is allowed to run rapidly into a suspension, cooled to 0° C., of 58.5 parts by weight of N-phenethyl-N-cyanoethyl-aniline in 320.0 parts by weight of isobutanol and the mixture is then further stirred for about 2 hours at a temperature rising to 20° C. The dyestuff formed is then filtered off and washed with 75.0 parts by weight of 48% strength sulphuric acid. The acid dyestuff paste is then suspended in aqueous sodium hydroxide solution at pH 9–10, the suspension is stirred at 60° C. for 1 hour and filtered again and the residue is washed with water until neutral and dried. The dyestuff is a dark blue powder which dissolves in concentrated sulphuric acid to give a brown-coloured solution.

75.0 Parts by weight of the dyestuff of the formula

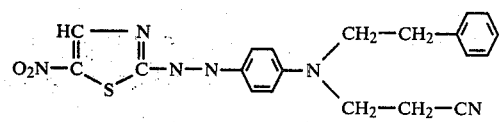

are obtained. This dyestuff has a purity of 97%, determined by physical comparison measurements against a crystalline sample.

EXAMPLE 8

34.2 Parts by weight of 42% strength nitrosylsulphuric acid are allowed to run into a suspension of 16.4 parts by weight of 2-amino-4,5-dimethylthiazole hydrochloride in 100 parts by weight of glacial acetic acid at +15° C. After subsequently stirring the mixture for one hour, the diazo solution is allowed to run into a suspension of 26.3 parts by weight of N-phenethyl-N-cyanoethyl-aniline, 160.0 parts by weight of isobutanol and 200.0 parts by weight of water at 0° C. The mixture is then further stirred overnight at a temperature rising to room temperature. The dyestuff which has separated out is then filtered off, washed thoroughly, first with 160.0 parts by weight of isobutanol and then with water, and dried. It is a red powder which dissolves in concentrated sulphuric acid to give a red-coloured solution, 26.7 parts by weight of the dyestuff of the formula

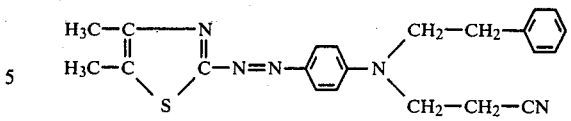

are obtained. This dyestuff has a purity of 98.2%, determined against a crystalline sample.

EXAMPLE 9

If 18.0 parts by weight of 2-amino-6-methoxy-benzthiazole are coupled with 26.3 parts by weight of N-phenethyl-N-cyanoethyl-aniline as described in Example 2, 32.6 parts by weight of the dyestuff of the formula

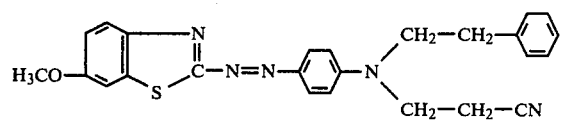

are obtained. This dyestuff has a purity of 94.5%, determined against a crystalline sample. The dyestuff is a red powder which dissolves in concentrated sulphuric acid to give a red-coloured solution. Dyes were also similarly prepared using the materials listed in table 7:

TABLE 7

| No. | Diazo component | Coupling component | Solvent |
|---|---|---|---|
| 1. | 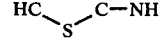 | 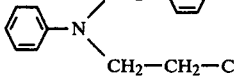 | isobutanol |
| 2. | 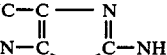 | 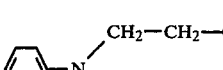 | " |
| 3. |  | 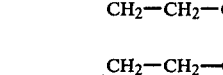 | n-butanol |
| 4. |  | 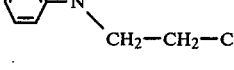 | isobutanol |
| 5. | 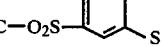 | 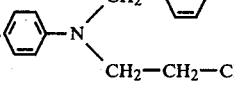 | isobutanol |
| 6. |  | 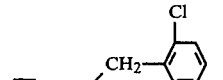 | n-butanol |
| 7. |  | 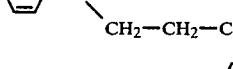 | n-butanol |

TABLE 7-continued

| No. | Diazo component | Coupling component | Solvent |
|---|---|---|---|
| 8. | HC=C-CO-OC₂H₅ ; O₂N-C(S)=C-NH₂ (thiazole) | C₆H₅-N(CH₂-CH₂-C₆H₅)(CH₂-CH₂-CN) | isobutanol |
| 9. | H₃C-C=N ; H₃C-C(S)=C-NH₂ (thiazole) | C₆H₅-N(CH₂-C₆H₅)(CH₂-CH₂-CN) | isobutanol |
| 10. | F₃C-C=N ; O₂N-C(S)=C-NH₂ (thiazole) | C₆H₅-N(CH₂-CH₂-C₆H₄-CH₃)(CH₂-CH₂-CN) | isobutanol |
| 11. | H₃CO-, H₅C₂O- substituted benzothiazole-2-NH₂ | C₆H₅-N(CH₂-CH₂-C₆H₅)(CH₂-CH₂-CN) | n-amyl alcohol |
| 12. | 3-amino-benzisothiazole | C₆H₅-N(CH₂-C₆H₅)(CH₂-CH₂-CN) | n-butanol |
| 13. | 3-phenyl-5-amino-1,2,4-triazole (NH) | C₆H₅-N(CH₂-C₆H₅)(CH₂-CH₂-CN) | isohexanol |
| 14. | HC=CH ; O₂N-C(S)=C-NH₂ (thiazole) | C₆H₅-N(CH₂-CH₂-C₆H₅)(CH₂-CH₂-CN) | isobutanol |
| 15. | HC=N ; O₂N-C(S)=C-NH₂ (thiazole) | C₆H₅-N(CH₂-C₆H₅)(CH₂-CH₂-CN) | isobutanol |
| 16. | 6-chloro-benzothiazole-2-NH₂ | C₆H₅-N(CH₂-C₆H₅)(CH₂-CH₂-CN) | n-butanol |
| 17. | 5-nitro-3-amino-benzisothiazole | C₆H₅-N(CH₂-CH₂-C₆H₅)(CH₂-CH₂-CN) | n-butanol |
| 18. | 3-amino-1,2,4-triazole (NH) | C₆H₅-N(CH₂-C₆H₅)(CH₂-CH₂-CN) | isobutanol |
| 19. | H₃C-C=C ; O₂N-C(S)=C-NH₂ (thiazole) | C₆H₅-N(CH₂-C₆H₄-CH₃)(CH₂-CH₂-CN) | isobutanol |
| 20. | H₃C-C=N ; O₂N-C(S)=C-NH₂ (thiazole) | C₆H₅-N(CH₂-CH₂-C₆H₅)(CH₂-CH₂-CN) | n-hexanol |

TABLE 7-continued

| No. | Diazo component | Coupling component | Solvent |
|---|---|---|---|
| 21. | (phenyl-C=N, O₂N-C-S-C-NH₂ thiadiazole) | C₆H₅-N(CH₂-C₆H₅)(CH₂-CH₂-CN) | isobutanol |
| 22. | benzothiazol-2-amine | C₆H₅-N(CH₂-CH₂-C₆H₄-OCH₃)(CH₂-CH₂-CN) | isobutanol |
| 23. | 4-nitrobenzothiazol-2-amine | C₆H₅-N(CH₂-C₆H₅)(CH₂-CH₂-CN) | diethylcarbinol |
| 24. | 5-nitro-7-chloro-benzisothiazol-3-amine | C₆H₅-N(CH₂-C₆H₅)(CH₂-CH₂-CN) | isobutanol |
| 25. | H₃C-O₂S-C=N-NH-C-NH₂ (triazole) | C₆H₅-N(CH₂-C₆H₅)(CH₂-CH₂-CN) | n-butanol |
| 26. | 3-nitro-thiophen-2-amine | C₆H₅-N(CH₂-CH₂-C₆H₅)(CH₂-CH₂-CN) | n-butanol |
| 27. | 4,5-dimethyl-thiophen-2-amine | C₆H₅-N(CH₂-CH₂-(2,4-di-CH₃-C₆H₃))(CH₂-CH₂-CN) | isobutyl-carbinol |
| 28. | 6-methoxy-benzothiazol-2-amine | C₆H₅-N(CH₂-C₆H₅)(CH₂-CH₂-CN) | isobutanol |
| 29. | 7-nitro-benzisothiazol-3-amine | C₆H₅-N(CH₂-CH₂-C₆H₅)(CH₂-CH₂-CN) | isobutanol |
| 30. | 6-ethoxy-benzothiazol-2-amine | C₆H₅-N(CH₂-(2,4-di-OCH₃-C₆H₃))(CH₂-CH₂-CN) | isobutanol |
| 31. | 6-nitro-benzothiazol-2-amine | C₆H₅-N(CH₂-CH₂-C₆H₅)(CH₂-CH₂-CN) | n-butanol |
| 32. | 5-nitro-thiophen-2-amine | C₆H₅-N(CH₂-CH₂-C₆H₄-OC₄H₉(n))(CH₂-CH₂-CN) | n-butanol |

TABLE 7-continued

| No. | Diazo component | Coupling component | Solvent |
|---|---|---|---|
| 33. | 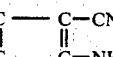 | 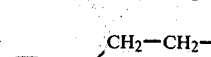 | n-butanol |
| 34. | 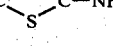 | 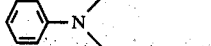 | n-butanol |
| 35. | 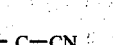 | 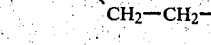 | n-butanol |
| 36. | 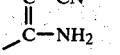 | 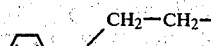 | isobutanol |
| 37. |  | 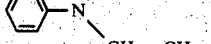 | isobutanol |
| 38. | 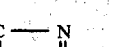 | 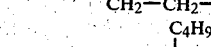 | n-butanol |
| 39. | 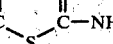 | 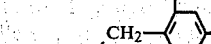 | n-butanol |
| 40. |  | 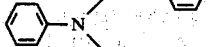 | isobutanol |
| 41. | 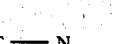 | 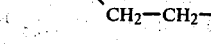 | isobutanol |
| 42. | 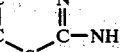 | 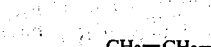 | isobutanol |
| 43. |  | 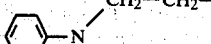 | isobutanol |

The spot or diazo test mentioned in some of the examples is carried out as follows:

A drop of the coupling batch is allowed to fall on a filter paper. A drop of an aqueous solution of R-salt (sodium salt of naphthol-2-disulfonic acid-3,6) is allowed to fall on the same filter paper in such a manner that the two spots overlap themselves partially. If a diazonium compound is still present in the coupling batch a red color occurs. If the spot test shows no residual diazonium content the coupling reaction is terminated and the dyestuff can be isolated. If there is no possibility for an intermediate isolation the batch is stirred until an isolation of the dyestuff is possible. In some cases the filtration properties of the dyestuff are improved by such a stirring.

Obviously many modifications and variations of the present invention are possible in the light of the above teachings. It is, therefore, to be understood that within the scope of the appended claims the invention may be practiced otherwise than as specifically described.

What is claimed:

1. In the process of preparing an azo dye by coupling a diazonium compound in aqueous solution with a coupling compound having the formula

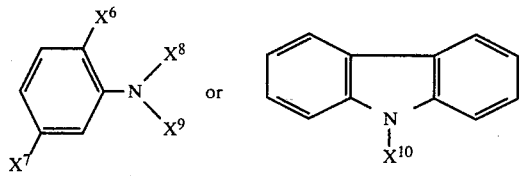

where
- $X^6$ is selected from the class consisting of hydrogen, halogen, alkyl of up to four carbons, and alkoxy of up to four carbons;
- $X^7$ is selected from the class consisting of $X^6$ and alkylcarbonylamino of up to 8 carbons in the alkyl moiety;
- $X^8$ and $X^9$ are independently unsubstituted or monosubstituted alkyl, the substitution being selected from the class consisting of halogen, hydroxy, cyano, alkyl-carbonyloxy, alkoxy, alkoxy-carbonyl, alkoxy-carbonyloxy, phenoxycarbonyl, phenoxycarbonyloxy, cyclohexyl, phenyl, halophenyl, alkylphenyl, phenoxy, halophenoxy and alkylphenoxy, each alkyl and alkoxy having up to four carbons; or
- $X^8$ and $X^9$ together with the N to which they are both bonded form a heterocyclic ring in which the N is linked through methylene groups to oxygen, another N, or an additional carbon; and
- $X^{10}$ is selected from the class consisting of hydrogen and $X^8$ at a temperature between about 0° and 80° in the presence of an acid, the improvement which comprises effecting the coupling essentially in a twophase mixture of water and a simple alkanol having four to six carbons in the molecule and soluble in water to the extent of not over about 15% by weight at 15° C., the mixture containing from about 15 to about 90% alkanol by weight, and then directly separating the dye in over 85% purity from the reaction mixture.

2. The process of claim 1 in which the dye is separated from the reaction mixture essentially solely by filtration and washing.

3. The process of claim 1 in which the dye is separated from the reaction mixture by evaporating off at least some of the alkanol and then filtering and washing.

4. The process of claim 1 in which the mixture contains from about 25 to about 50% by weight of the alkanol.

5. The process of claim 1 in which the alkanol is n-butanol or isobutanol.

6. The process of claim 1 in which the coupling is effected at a temperature not over about 60° C.

7. The process of claim 1 in which the coupling is effected at a temperature not over about 5° C.

8. The process of claim 1 in which the coupling is effected by mixing an acidified water solution of the diazonium compound with a dispersion of the coupling compound in the alkanol.

9. The process of claim 1 in which the diazonium compound is the diazotized amine

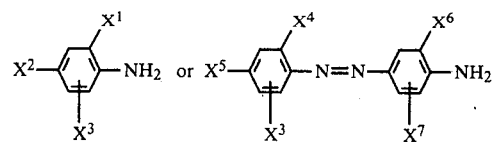

where $X^1$ and $X^2$ are independently selected from the class consisting of hydrogen, halogen, nitro, cyano, trifluoromethyl, alkyl having up to four carbons, alkoxy having up to four carbons and the following substituents of which each alkyl and alkoxy contains up to 8 carbons: alkoxy-carbonyl, alkyl-carbonyl, carboxamide, N-monoalkyl carboxamide, N,N-dialkyl carboxamide, alkyl sulfonyl, sulphonamide, N-monoalkyl sulphonamide and N,N-dialkyl sulphonamide; phenoxy, phenalkoxy having up to 2 carbons in the alkoxy moiety, phenylsulphonyl, benzoyl, halophenoxy, alkylphenoxy having up to 4 carbons in the alkyl moiety, alkoxyphenoxy having up to 4 carbons in the alkoxy moiety, halophenalkoxy having up to 2 carbons in the alkoxy moiety, alkylphenalkoxy having up to 2 carbons in the alkoxy moiety and up to 4 carbons in the alkyl moiety, alkoxyphenalkoxy wherein a phenalkoxy group containing up to 2 carbons in the alkoxy moiety is substituted with alkoxy containing up to 4 carbons, halophenylsulphonyl, alkylphenylsulphonyl containing up to 4 carbons in the alkoxy-moiety, alkoxyphenylsulphonyl containing up to 4 carbons in the alkoxy moiety, halobenzoyl, alkylbenzoyl containing up to 4 carbons in the alkyl moiety, alkoxybenzoyl containing up to 4 carbons in the alkoxy moiety.

10. The process of claim 1 in which the diazonium compound is the diazotised amine

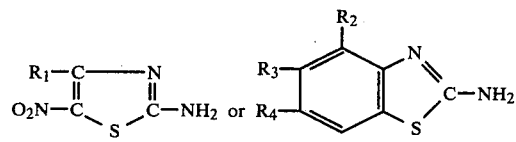

wherein
- $R_1$ is selected from the class consisting of hydrogen and methyl;
- $R_2$ is selected from the class consisting of hydrogen and nitro;
- $R_3$ is selected from the class consisting of hydrogen and methoxy;
- $R_4$ is selected from the class consisting of hydrogen, chlorine, methoxy, ethoxy, nitro and methylsulphonyl.

11. The process of claim 1 in which the diazonium compound is the diazotised amine

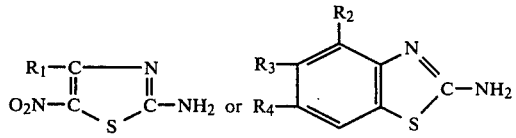

wherein
- $R_1$ is selected from the class consisting of hydrogen and methyl;

$R_2$ is selected from the class consisting of hydrogen and nitro;

$R_3$ is selected from the class consisting of hydrogen and methoxy;

$R_4$ is selected from the class consisting of hydrogen, chlorine, methoxy, ethoxy, nitro and methylsulphonyl; and the coupling compound is

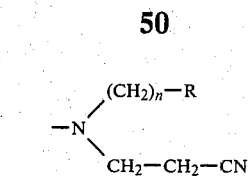

wherein

R is a phenyl radical which is optionally monosubstituted or disubstituted by halogen, alkyl containing 1 to 4 C atoms, alkoxy containing 1 to 4 C atoms and n is the number 1 or 2.

12. The process of claim 1 wherein the diazonium compound is a member selected from the group consisting of substituted and unsubstituted diazotised aminothiazole, aminobenzthiazole, aminobenzisothiazole, aminothiadiazole, aminotriazole and aminothiophene.

* * * * *

UNITED STATES PATENT AND TRADEMARK OFFICE
CERTIFICATE OF CORRECTION

PATENT NO. : 4,313,872

DATED : February 2, 1982

INVENTOR(S) : Ernst Heinrich et al

It is certified that error appears in the above-identified patent and that said Letters Patent is hereby corrected as shown below:

Col. 2, line 19, "sodium nitrate" should read --sodium nitrite--

Signed and Sealed this

Fourth Day of January 1983

[SEAL]

Attest:

Attesting Officer

GERALD J. MOSSINGHOFF

Commissioner of Patents and Trademarks